(12) United States Patent
Lee et al.

(10) Patent No.: US 10,234,724 B2
(45) Date of Patent: Mar. 19, 2019

(54) DISPLAY APPARATUS

(71) Applicant: SAMSUNG ELECTRONICS CO., LTD., Suwon-si (KR)

(72) Inventors: Kil Hong Lee, Suwon-si (KR); Dae Young Kim, Hwaseong-si (KR); Hyung-Ki Kim, Anyang-si (KR); Duk Jin Jeon, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/802,575

(22) Filed: Nov. 3, 2017

(65) Prior Publication Data
US 2018/0246378 A1 Aug. 30, 2018

(30) Foreign Application Priority Data
Feb. 24, 2017 (KR) ........................ 10-2017-0024865

(51) Int. Cl.
*F21V 7/04* (2006.01)
*G02F 1/1335* (2006.01)
*F21V 8/00* (2006.01)

(52) U.S. Cl.
CPC ....... *G02F 1/133603* (2013.01); *G02B 6/009* (2013.01); *G02B 6/0035* (2013.01); *G02B 6/0088* (2013.01); *G02F 1/133608* (2013.01); *G02F 1/133615* (2013.01)

(58) Field of Classification Search
CPC .. G02B 6/0011; G02B 6/0065; G02B 6/0073; G02B 6/0081; G02B 6/0083; G02B 6/0086; G02F 1/133602; G02F 1/133603; G02F 1/133604; G02F 1/133608; G02F 1/133615
USPC .... 362/97.1–97.4, 612, 630–634; 349/58–60
See application file for complete search history.

(56) References Cited

U.S. PATENT DOCUMENTS 7,324,174 B2 * 1/2008 Hafuka ............. G02F 1/133608
349/58

FOREIGN PATENT DOCUMENTS

KR 10-2016-0007854 A 1/2016

* cited by examiner

*Primary Examiner* — Jason M Han
(74) *Attorney, Agent, or Firm* — Sughrue Mion, PLLC

(57) ABSTRACT

A display apparatus includes a display panel, a light guide plate configured to guide light to the display panel, a light source module configured to emit light toward the light guide plate, optical sheets disposed between the display panel and the light guide plate, a bottom chassis, on which the light guide plate is seated, and configured to support the optical sheets to be spaced apart from the light guide plate forming an optical distance between the optical sheets and the light guide plate, and a plurality of supporters fixed to the bottom chassis and configured to support the optical sheets to prevent the optical sheets from sagging.

16 Claims, 12 Drawing Sheets

DISPLAY APPARATUS

CROSS-REFERENCE TO RELATED APPLICATION(S)

This application claims priority from Korean patent application No. 10-2017-0024865, filed on Feb. 24, 2017 in the Korean Intellectual Property Office, the disclosure of which is incorporated herein in its entirety by reference.

BACKGROUND

1. Field

Apparatuses and methods consistent with exemplarily embodiments relate to a display apparatus for a uniform screen.

2. Description of the Related Art

In general, display apparatuses display screens and include monitors and TVs.

Various types of display apparatuses such as display apparatuses using a cathode ray tube (CRT), display apparatuses using a light emitting diode (LED), display apparatuses using an organic light emitting diode (OLED), display apparatuses using an active-matrix organic light emitting diode, display apparatuses using a liquid crystal displays, display apparatuses using an E-paper display, and the like have been used.

A display apparatus generally includes a display panel optically displaying an image and a backlight unit (BLU) providing light to the display panel.

In general, a display panel does not emit light. Thus, the display panel displays an image for example, by receiving light from a backlight unit disposed at a rear surface of the display panel.

As a light source of the backlight unit, a cold cathode fluorescent lamp (CCFL) has been conventionally used. However, light emitting diodes (LEDs) have also recently been widely used in various fields due to advantages in terms of weight, thickness, power consumption, color range, switching time, lifespan, and the like.

Backlight units may be generally classified into edge-type backlight units and direct-type backlight units depending on the positions of light emitting diodes that are used as light sources.

The edge type backlight unit includes light emitting diodes disposed to emit light to an edge of a light guide plate. The light guide plate may change the direction of light emitted from the light emitting diodes and guide it to a display panel. The direct-type backlight unit includes light emitting diodes disposed throughout an entire rear surface of a display panel and light may be directly transmitted to a display panel without using a light guide plate.

In the case of the edge type backlight unit, small scratches and foreign substances disposed on a light guide plate may be directly visible on a screen through a display panel. Thus there is a need to pay particular attention to package and transportation of the light guide plate to prevent scratches, resulting in an increase in costs of parts.

In the case of the direct-type backlight unit, a large number of light emitting diodes is generally required, which results in high power consumption required to drive the light emitting diodes. Also, since lenses are generally used in the direct-type backlight unit, an optical distance generally needs to be secured in order to remove hot spots formed on the lenses. In addition, regions of a display apparatus where the light emitting diodes are not disposed are recognized as dark portions, and thus the appearance of a display may deteriorate.

SUMMARY

One or more exemplary embodiments provide a display apparatus compensating for appearance deteriorating factors due to small scratches and foreign substances on a light guide plate by aligning a plurality of light sources at an edge of the light guide plate and forming an optical distance between the light guide plate and optical sheets.

In accordance with an aspect of an exemplary embodiment, provided is a display apparatus comprising: a display panel; a light guide plate configured to guide light to the display panel; a light source module configured to emit light toward the light guide plate; optical sheets disposed between the display panel and the light guide plate, spaced apart from the light guide plate; a bottom chassis, on which the light guide plate is seated, configured to support the optical sheets, forming an optical distance between the optical sheets and the light guide plate; and a plurality of supporters fixed to the bottom chassis and configured to support the optical sheets to prevent the optical sheets from sagging.

The light source module comprises a printed circuit board having a conductive pattern and a plurality of light sources mounted on the printed circuit board, and fixed to a fixing rail such that the plurality of light sources are spaced apart from the light guide plate at regular intervals.

A mounting plate to mount the fixing rail thereon is coupled to the bottom chassis and the fixing rail is mounted on the mounting plate.

The fixing rail comprises a plurality of support parts into which the printed circuit board is inserted and supported thereby, a plurality of dislocation prevention protrusions fixing the printed circuit board inserted into the plurality of support parts to prevent dislocation of the printed circuit board, an opening allowing the plurality of light sources to emit light toward the light guide plate, and a plurality of fixing hooks fixed to the mounting plate.

The printed circuit board comprises a plurality of dislocation prevention protrusion fixing grooves to which the plurality of dislocation prevention protrusions is fixed.

The fixing hooks comprise first fixing hooks disposed at lower opposite ends of the fixing rail and a plurality of second fixing hooks disposed at an upper end of the fixing rail.

The mounting plate comprises first fixing holes configured to fix the first fixing hooks, second fixing holes configured to fix the second fixing hooks, and a plurality of through holes through which the plurality of dislocation prevention protrusions pass.

The bottom chassis of the display apparatus may comprises a seating portion on which the light guide plate is seated, an extension portion extending from an edge of the seating portion having an inclined surface formed at an obtuse angle with respect to the seating portion, and a support surface provided at an end of the extension portion configured to support the display panel and the optical sheets.

The display panel and the optical sheets supported by the support surface have a larger area than that of the light guide plate seated on the seating portion.

The light source module emits light toward a lower end of the light guide plate, light emitted from the light source module is guided to the display panel disposed in front of the light guide plate by the light guide plate, and a portion of the light emitted from the light source module is discharged out via left and right sides and an upper end of the light guide plate.

The light discharged out of the light guide plate via the left and right sides and the upper end of the light guide plate is guided to edges of the display panel having a larger area than that of the light guide plate along the extension portion of the bottom chassis.

A pattern configured to increase an amount of light guided by the light guide plate may be formed at left and right edges of a front surface of the light guide plate.

The bottom chassis of the display apparatus may comprises a plurality of fixing parts to which the plurality of supporters is fixed, and the fixing parts comprise an insertion hole into which the supporters are inserted, a fixing groove configured to fix the supporters inserted into the insertion hole, and a plurality of protruding portions constituting the fixing groove.

The supporters comprise a fixing protrusion inserted into the insertion hole and fixed by the fixing groove, a base supported by the fixing part, and a support protrusion configured to support the optical sheets.

The light guide plate comprises a support protrusion through hole through which the support protrusion passes, the support protrusion through hole is provided in a number equal to the number of the plurality of supporters and the plurality of fixing parts, and the light guide plate is fixed to the bottom chassis by the support protrusion penetrating the support protrusion through holes.

In accordance with an aspect of another exemplary embodiment, provided is a display apparatus comprising: a display panel; a light guide plate configured to guide light to the display panel; a light source module configured to emit light toward the light guide plate and comprising a printed circuit board having a conductive pattern, and a plurality of light sources mounted on the printed circuit board; optical sheets disposed between the display panel and the light guide plate; a bottom chassis, on which the light guide plate is seated, configured to support the display panel such that the display panel and the optical sheets are spaced apart from the light guide plate; and a fixing rail mounted on the bottom chassis and configured to fix the light source module such that the plurality of light sources are spaced apart from the light guide plate at regular intervals.

The display apparatus may further comprise a plurality of supporters fixed to the bottom chassis and configured to support the optical sheets to prevent the optical sheets from sagging.

The plurality of supporters supports the optical sheets in a state of penetrating the light guide plate, and the light guide plate is fixed to the bottom chassis by the plurality of supporters penetrating the light guide plate.

The light source module is fixed to a fixing rail, the fixing rail allowing the plurality of light sources to be spaced apart from the light guide plate at regular intervals.

In accordance with an aspect of another exemplary embodiment, provided is a display apparatus comprising :a display panel; a light guide plate configured to guide light to the display panel; a light source module configured to emit light toward the light guide plate; optical sheets disposed between the display panel and the light guide plate and spaced apart from the light guide plate; a bottom chassis comprising a seating portion on which the light guide plate is seated, an extension portion extending from an edge of the seating portion having an inclined surface formed at an obtuse angle with respect to the seating portion, and a support surface provided at an end of the extension portion to support the optical sheets; and a plurality of supporters fixed to the bottom chassis and configured to support the optical sheets in a state of penetrating the light guide plate to prevent the optical sheets from sagging. The light source module may comprise a printed circuit board having a conductive pattern and a plurality of light sources mounted on the printed circuit board, and the light source module is fixed to a fixing rail, the fixing rail allowing the plurality of light sources to be spaced apart from the light guide plate at regular intervals.

BRIEF DESCRIPTION OF THE DRAWINGS

The above and/or other aspects will become more apparent by describing certain exemplary embodiments with reference to the accompanying drawings in which.

DETAILED DESCRIPTION

Certain exemplary embodiments are described in greater detail below with reference to the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the drawings, to explain aspects of the present description. Sizes of elements in the drawings may be exaggerated for convenience of explanation. In other words, since sizes and thicknesses of components in the drawings are arbitrarily illustrated for convenience of explanation, the following exemplary embodiments are not limited thereto. In addition, the terms used in the present specification are merely used to describe particular embodiments, and are not intended to limit the present disclosure. An expression used in the singular encompasses the expression of the plural, unless it has a clearly different meaning in the context. In the present specification, it is to be understood that the terms such as "including" or "having," etc., are intended to indicate the existence of the features, numbers, operations, components, parts, or combinations thereof disclosed in the specification, and are not intended to preclude the possibility that one or more other features, numbers, operations, components, parts, or combinations thereof may exist or may be added.

It will be understood that, although the terms "first", "second", etc., may be used herein to describe various elements, these elements should not be limited by these terms. The above terms are used only to distinguish one component from another. For example, a first component discussed below could be termed a second component, and similarly, the second component may be termed the first component without departing from the teachings of this disclosure. As used herein, the term "and/or" includes any and all combinations of one or more of the associated listed items.

Meanwhile, the terms used throughout the specification "front surface", "rear surface", "in front of", "behind", "upper", "lower", "upper end", "lower end", "left" and "right" are defined based on the drawings and the shape and position of each element are not limited by these terms.

Referring to FIGS. 1 to 5, a display apparatus according to an exemplary embodiment includes a display panel 10 configured to display an image, a light guide plate 20 disposed behind the display panel 10 and configured to guide light received from a light source module 30, which will be described below, to the display panel 10, a light source module 30 configured to emit light toward the light guide plate 20, optical sheets 40 disposed between the display panel 10 and the light guide plate 20 and configured to improve optical properties of light guided to the display panel 10 by the light guide plate 20, and a bottom chassis 50 disposed behind the display panel 10 and defining a rear appearance of the display apparatus.

Although not shown in the drawings, a reflector sheet that reflects light emitted from a rear surface of the light guide plate 20 forward may be disposed behind the light guide plate 20.

The display panel 10 according to the exemplary embodiment is formed of a liquid crystal display panel and may include a thin film transistor (TFT) substrate (not shown) provided with TFTs, a color filter substrate (not shown) facing the TFT substrate, and liquid crystals (not shown) disposed between the TFT substrate and the color filter substrate.

The TFT substrate may be a transparent glass substrate on which TFTs, as switching devices, may be formed in a matrix form.

In each of the TFTs, a data line may be connected to a source terminal, a gate line may be connected to a gate terminal, and a pixel electrode, which may be formed of a transparent conductive material, may be connected to a drain terminal.

The color filter substrate may be a substrate facing the TFT substrate, and maybe spaced a certain distance apart from the TFT substrate and including color pixels, i.e., Red, Green, and Blue pixels, which may be formed in a thin film process and adapted to reveal predetermined colors while light passes therethrough.

A common electrode formed of a transparent conductive material may be provided on a front surface of the color filter substrate.

In the display panel 10 having the aforementioned exemplary configuration, when power is applied to the gate terminal of the TFT, an electric field may be formed between the pixel electrode and the common electrode, and alignment of the liquid crystals interposed between the TFT substrate and the color filter substrate may be changed by the electric field.

Although the display panel 10 may form an image by adjusting the alignment of the liquid crystals, the display panel 10 may not produce light itself. Thus, the display panel 10 may display an image by receiving light from the light source module 30 disposed at a rear surface of the display panel 10.

A driving printed circuit board (not shown) configured to supply a drive signal to the display panel 10 may be disposed under the display panel 10. The display panel 10 and the driving printed circuit board may be electrically connected to each other via a plurality of flexible printed circuit films (not shown) having a driver chip (not shown) mounted on one surface thereof.

The light guide plate 20 may be disposed behind the display panel 10 and may guide light emitted from the light source module 30 to the display panel 10.

The light source module 30 may be disposed below a lower end of the light guide plate 20 and may be spaced apart therefrom at a predetermined distance and may emit light toward the lower end of the light guide plate 20. Light arriving at the light guide plate 20 may have its direction changed by the light guide plate 20 and may be transmitted to the display panel 10.

Figure 7:
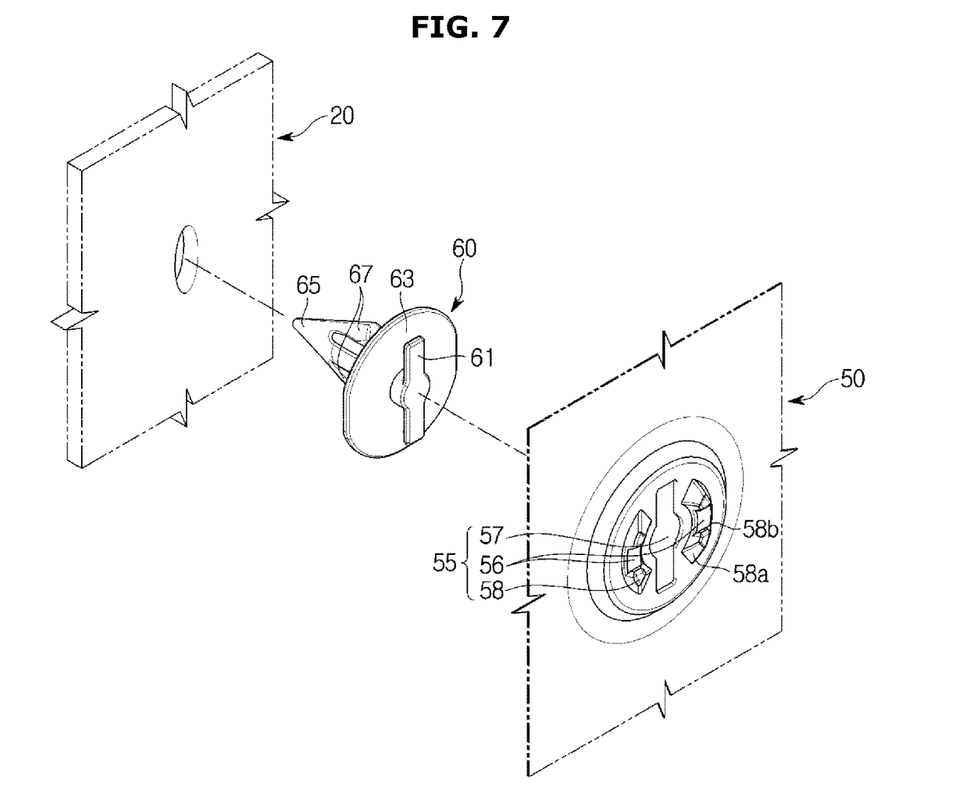
FIG. 7 is a view illustrating that the supporter is fixed to the bottom chassis and penetrates the light guide plate according to an exemplary embodiment.

The light guide plate 20 may be seated on the bottom chassis 50 and may include a support protrusion through hole 21 through which a support protrusion 65 of the supporter 60 fixed to the bottom chassis 50, which will be described below, passes, and a pattern 23 may be formed at left and right side edges of the front surface (FIG. 7).

The light guide plate 20, which may be seated on the bottom chassis 50, may be fixed to the bottom chassis 50 by the support protrusion 65 of the supporter 60 passing through the support protrusion through hole 21.

The pattern 23 may be formed at left and right side edges of the front surface of the light guide plate 20 to increase an amount of light guided to left and right side edges of the display panel 10 that has a relatively large area in comparison with the light guide plate 20. This will be described later.

The light source module 30 may be disposed behind the non-emissive display panel 10 and may supply light to the display panel 10.

The light source module 30 may be fixed to a fixing rail 70, which will be described below, to emit light toward the lower end of the light guide plate 20 and may include a printed circuit board 31 having a conductive pattern and a plurality of light sources 35 mounted on the printed circuit board 31.

Figure 10:
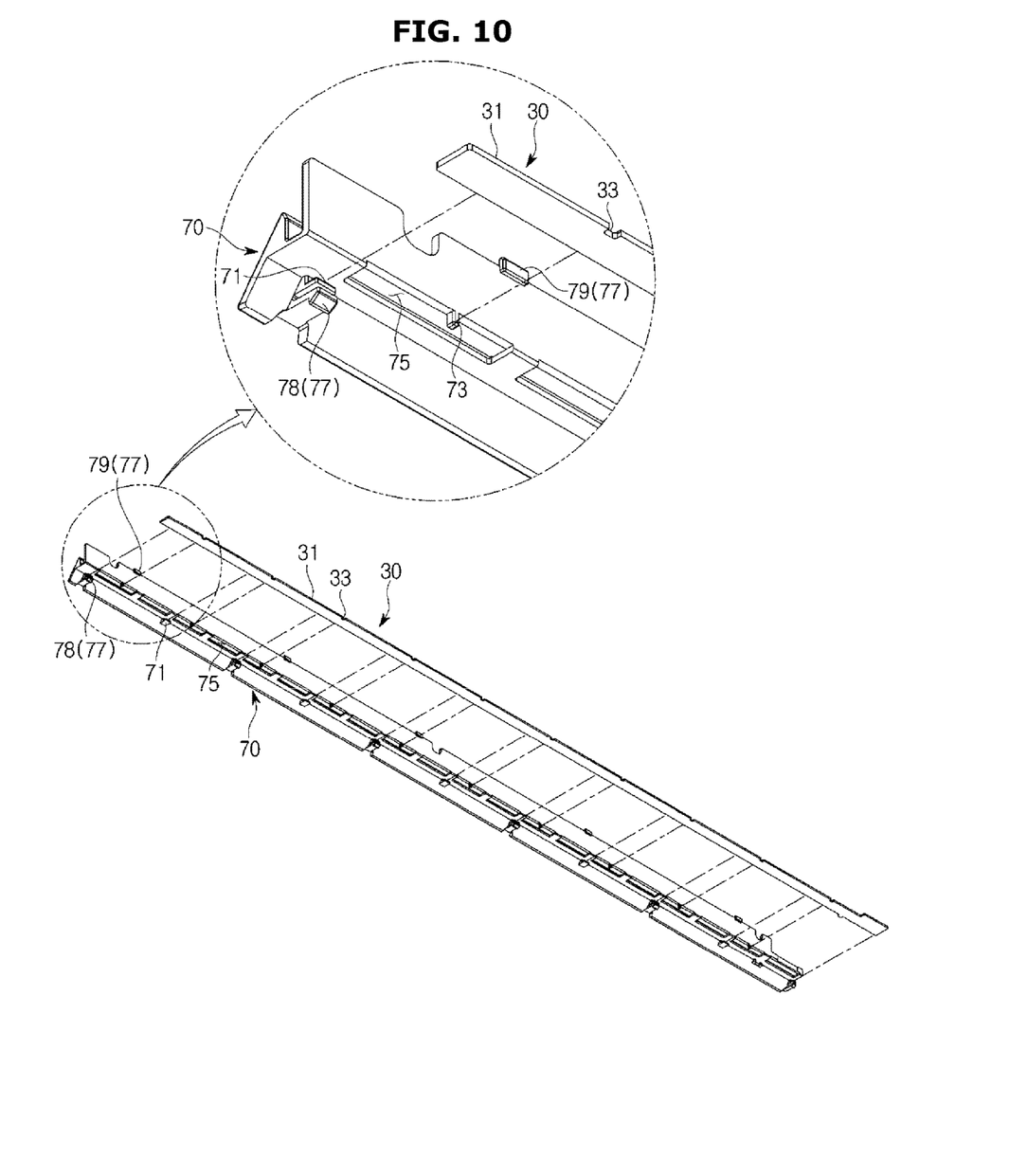
FIG. 10 is a view illustrating the light source module fixed to the fixing rail according to an exemplary embodiment.
Figure 11:
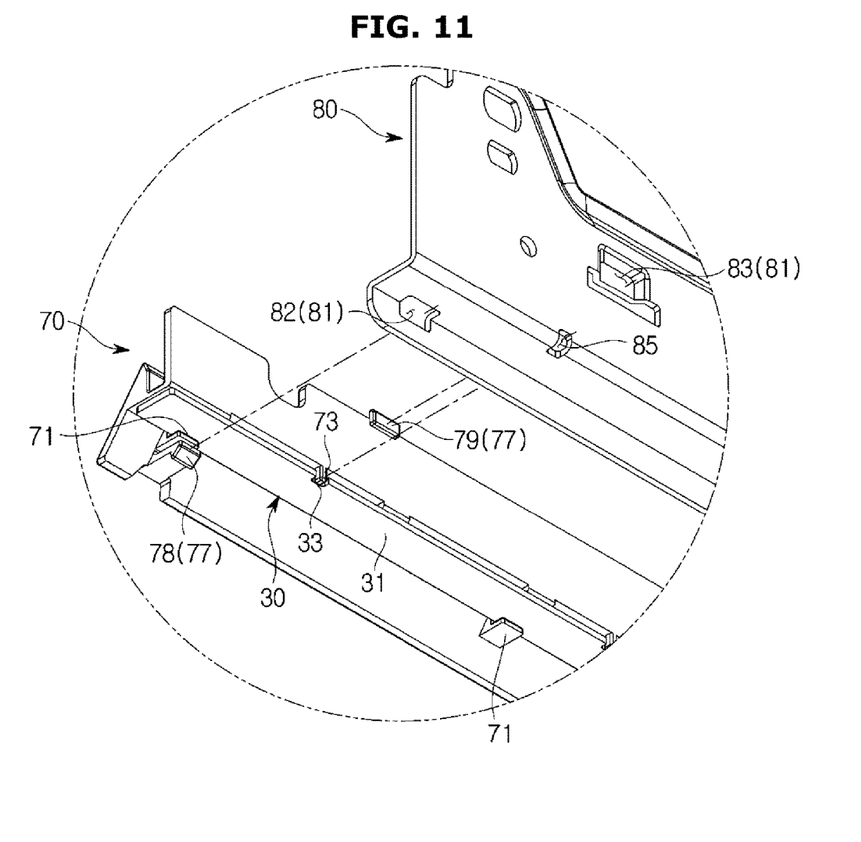
FIG. 11 is a view illustrating that the fixing rail to which the light source module is fixed is mounted on the mounting plate according to an exemplary embodiment.

The printed circuit board 31 may include dislocation prevention protrusion fixing grooves 33 fixed to a plurality of dislocation prevention protrusions 73 of the fixing rail 70 and configured to prevent dislocation of the printed circuit board 31 when the printed circuit board 31 is fixed to the fixing rail 70 to be described below (FIGS. 10 and 11).

The plurality of light sources 35 may be implemented using a plurality of light emitting diodes (LEDs). However it will be noted that the plurality of light sources 35 may be implemented by other means.

The light source module 30 may emit light toward the lower end of the light guide plate 20 in a state of being spaced apart from the lower end of the light guide plate 20 at a predetermined distance. Light emitted toward the lower end of the light guide plate 20 may have its direction changed by the light guide plate 20 and may be guided to the display panel 10 disposed in front of the light guide plate 20.

Most of light emitted toward the lower end of the light guide plate 20 from the light source module 30 may have its direction changed by the light guide plate 20 and may be guided to the display panel 10. However, some of the light may be discharged out of the light guide plate 20 via an upper end and both sides of the light guide plate 20.

The light discharged out of the light guide plate 20 via the upper end and both sides of the light guide plate 20 may be transmitted to the display panel 10 having a larger area than the light guide plate 20 by a shape of an extension portion 52 of the bottom chassis 50 which will be described below.

The optical sheets 40 may be disposed between the display panel 10 and the light guide plate 20 to improve optical properties of light guided to the display panel 10 by the light guide plate 20 and may include a diffuser sheet configured to improve uniformity of brightness by diffusing light guided by the light guide plate 20, a light collecting sheet configured to align the direction of light such that light diffused by the diffuser sheet is vertically incident on the display panel 10, and a protection sheet configured to protect the light collecting sheet.

The optical sheets 40, together with the display panel 10, may be supported by a support surface 53 of the bottom chassis 50 to be spaced apart from the light guide plate 20 seated on a seating portion 51 of the bottom chassis 50.

An optical distance D may be formed between the light guide plate 20 and the optical sheets 40 by a separation distance between the light guide plate 20 and the optical sheets 40, and thus appearance deteriorating factors caused by dents, foreign objects, and scratches of the light guide plate 20 may not be directly recognized from the outside of the display panel 10.

The bottom chassis 50 may be disposed behind the display panel 10 and define a rear appearance of the display apparatus.

Although the rear appearance of the display apparatus is defined by the bottom chassis 50 disposed behind the display panel 10, the present exemplary embodiment is not limited thereto and a cover member defining the rear appearance of the display apparatus may also be disposed behind the bottom chassis 50.

The bottom chassis 50 may include the seating portion 51 on which the light guide plate 20 is seated, an extension portion 52 extending from edges of the seating portion 51 to have an inclined surface formed at an obtuse angle with respect to the seating portion 51, and a support surface 53 provided at the end of the extending portion 52 to support the display panel 10 and the optical sheets 40.

Since the extension portion 52 may extend from the seating portion 51 to have an inclined surface formed at an obtuse angle with respect to the seating portion 51, the extension portion 52 may extend from the seating portion 51 to the display panel 10 in a direction so as to increase the area of the seating portion 51.

Thus, in the exemplary embodiment, the area of the support surface 53 disposed at the end of the extending portion 52 may be larger than that of the seating portion 51.

Since the area of the support surface 53 may be larger than that of the seating portion 51, the area of the display panel 10 supported by the support surface 53 may be larger than that of the light guide plate 20 seated on the seating portion 51.

Since the area of the display panel 10 may be larger than that of the light guide plate 20, an amount of light guided to edges of the display panel 10 which are not covered with the light guide plate 20 may decrease.

However, the inclined surface of the extension portion 52 may supplement an insufficient amount of emitted light arriving at the edge portions of the display panel 10 which are not covered by the light guide plate 20 since light emitted to the upper end and left and right side edges of the light guide plate 20 may be guided to the edge portions of the display panel 10 along the extension portion 52.

Also, since the pattern 23 may be formed at left and right side edges of the front surface of the light guide plate 20 to supplement the insufficient amount of emitted light, the amount of emitted light may be increased at the left and right edges of the front surface of the light guide plate 20.

According to the structure of the bottom chassis 50, a sufficient amount of light may be guided to the edge portions of the display panel 10 which are not covered by the light guide plate 20 even when the light guide plate 20 is fabricated to be smaller than the display panel 10.

A bezel 54 may be provided on the front surface of the bottom chassis 50 to cover the edge portions of the display panel 10 to prevent exposure of the edges to the outside.

Figure 1:
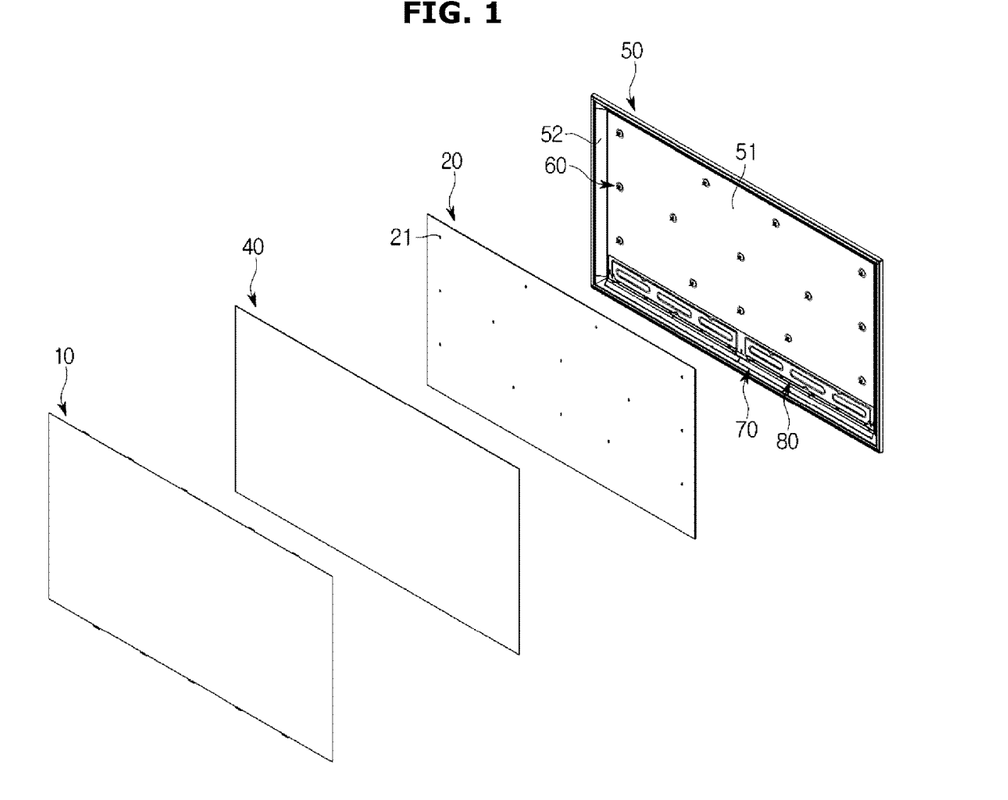
FIG. 1 is an exploded perspective view illustrating a display apparatus according to an exemplary embodiment.
Figure 2:
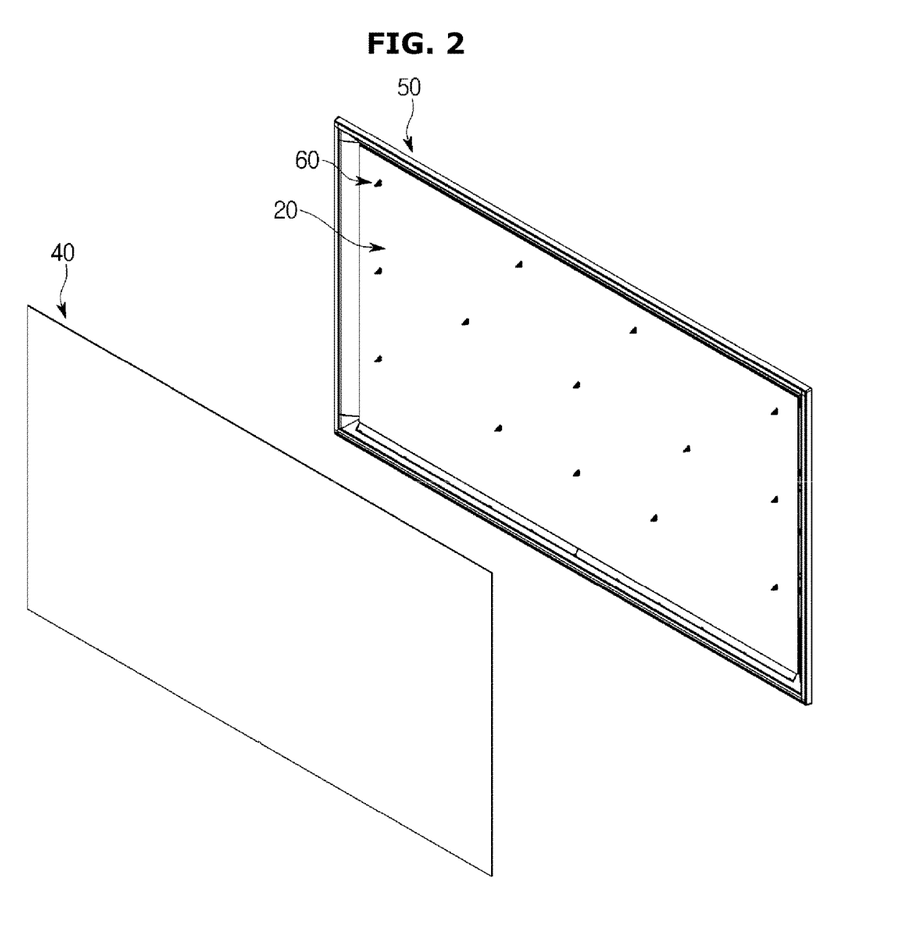
FIG. 2 is a view illustrating a bottom chassis on which a light guide plate is seated and optical sheets are supported by the bottom chassis, according to an exemplary embodiment.
Figure 3:
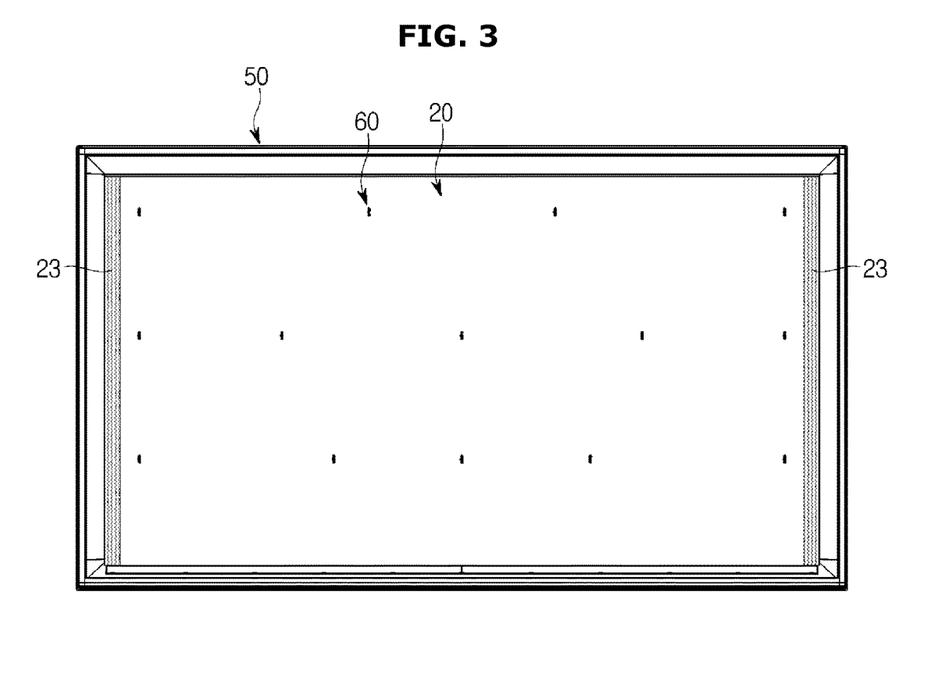
FIG. 3 is a view illustrating a pattern formed at left and right side edges of a front surface of the light guide plate fixedly seated on the bottom chassis according to an exemplary embodiment.
Figure 4:
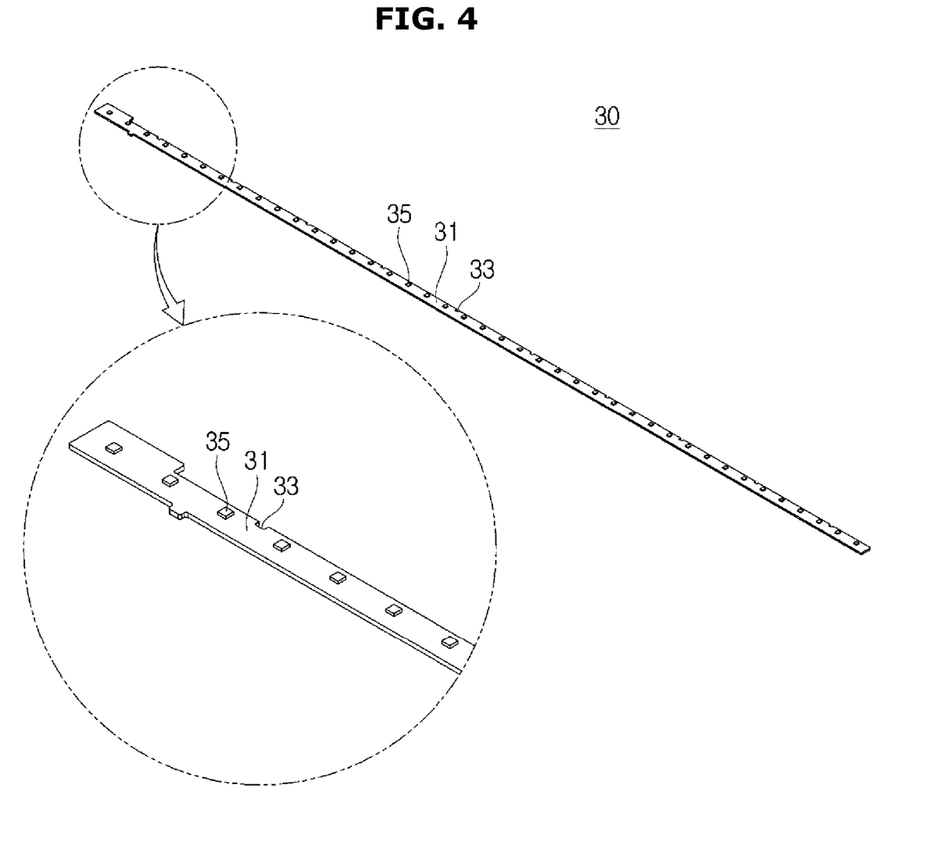
FIG. 4 is a light source module according to an exemplary embodiment.
Figure 5:
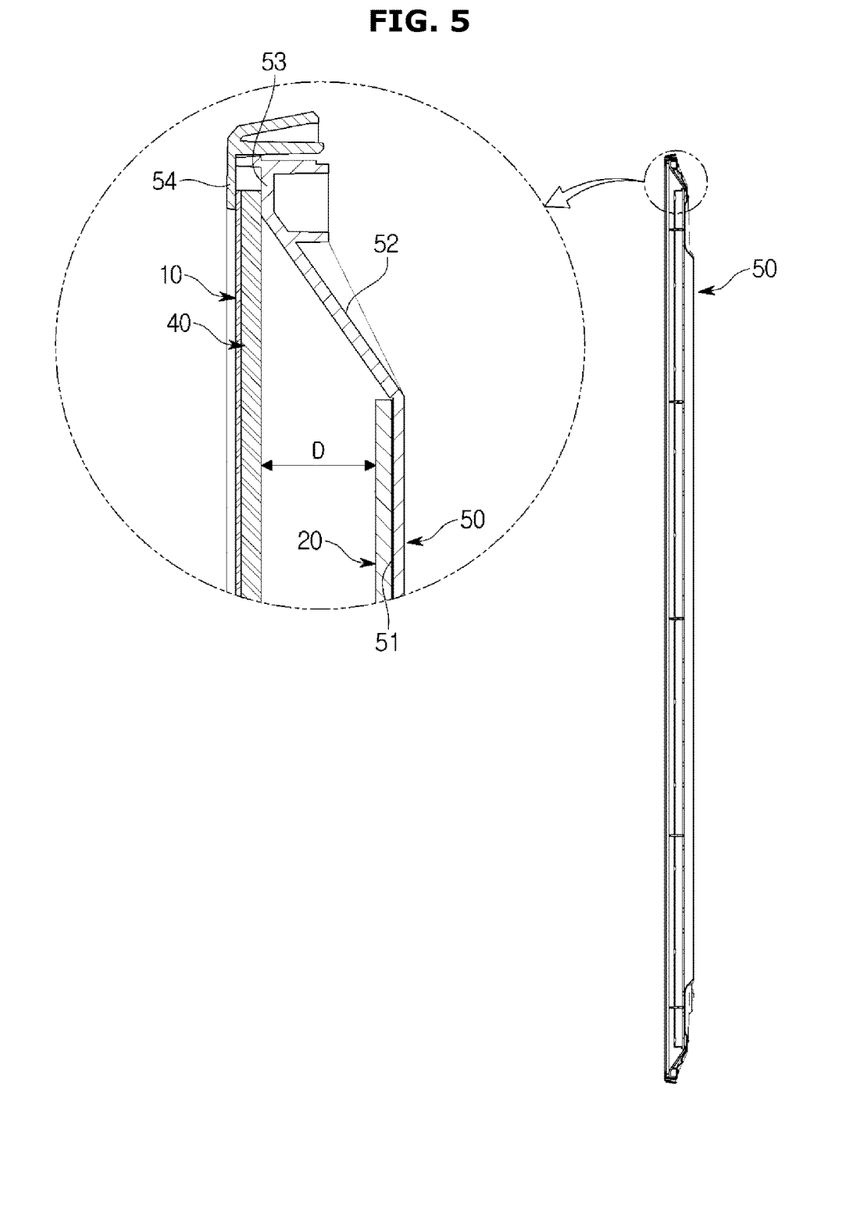
FIG. 5 is a cross-sectional view of a display apparatus according to another exemplary embodiment.
Figure 6:
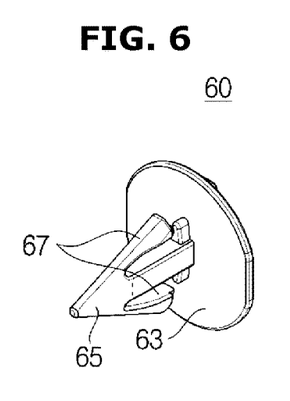
FIG. 6 is a perspective view illustrating a supporter according to an exemplary embodiment.
Figure 8:
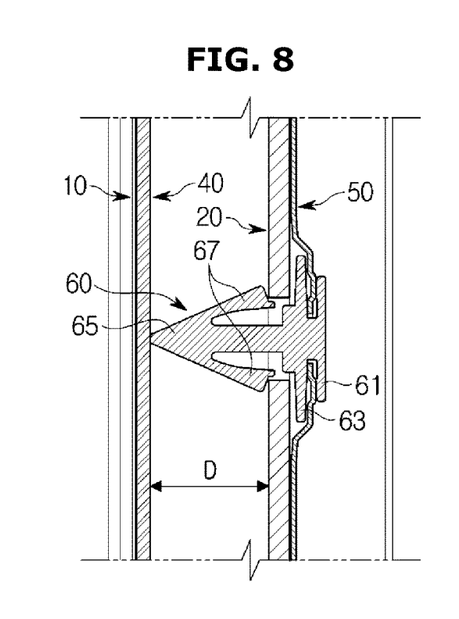
FIG. 8 is a cross-sectional view illustrating the supporter fixed to the bottom chassis and supporting the optical sheets according to an exemplary embodiment.

FIG. 6 is a perspective view illustrating a supporter according to an exemplary embodiment. FIG. 7 is a view illustrating that the supporter is fixed to the bottom chassis and penetrates the light guide plate according to an exemplary embodiment. FIG. 8 is a cross-sectional view illustrating the supporter fixed to the bottom chassis and supporting the optical sheets according to an exemplary embodiment.

As illustrated in FIGS. 1, 2, and 6 to 8, the supporter 60, which may be fixed to the seating portion 51 of the bottom chassis 50 may be provided so as to be plural in number and the light guide plate 20 may be fixed to the bottom chassis 50 by the plurality of supporters 60 penetrating the light guide plate 20.

The bottom chassis 50 may include a plurality of fixing parts 55 to which the plurality of supporters 60 may be fixed. The fixing part 55 may include an insertion hole 56 into which a fixing protrusion 61 of the supporter 60 is inserted, a fixing groove 57 to which the fixing protrusion 61 inserted into the insertion hole 56 is fixed, and a plurality of protruding portions 58 constituting the fixing groove 57.

In addition, the bottom chassis 50 may include a plurality of first coupling holes 59 to which a mounting plate 80 which will be described below is coupled.

The plurality of fixing part 55 may be provided in a number equal to the number of the plurality of supporters 60 and recessed toward the bottom chassis 50.

The insertion hole 56 may have a shape corresponding to that of the fixing protrusion 61 and a size the same as or different from the fixing protrusion 61 to allow the fixing protrusion 61 to be inserted thereinto.

The fixing groove 57 may be provided to fix the fixing protrusion 61 inserted into the insertion hole 56 and may be defined by the plurality of protruding portions 58 formed around the insertion hole 56.

The protruding portion 58 may be provided four in number and recessed backward from the fixing part 55.

Each of the four protruding portions 58 may have an inclined surface 58a formed adjacent to the insertion hole 56 and a stepped portion 58b formed adjacent to the fixing groove 57.

Since the four protruding portions 58 respectively may have inclined surfaces 58a formed adjacent to the insertion hole 56, the fixing protrusion 61 inserted into the insertion hole 56 may smoothly rotate along the inclined surfaces 58a.

In addition, the stepped portions 58b, which may be formed adjacent to the fixing groove 57, may prevent rotation of the fixing protrusion 61 after the fixing protrusion 61 rotates along the inclined surfaces 58a while being fixed by the fixing groove 57.

The operation of fixing the supporter 60 to the bottom chassis 50 will now be described. The fixing protrusion 61 of the supporter 60 may be inserted into the insertion hole 56 of the fixing part 55 provided at the bottom chassis 50 from the front side of the bottom chassis 50. Then, the fixing protrusion 61 may be rotated along the inclined surfaces 58a of the protruding portion 58 by rotating the supporter 60.

When the fixing protrusion 61 rotates along the inclined surfaces 58a while being fixed to the fixing groove 57, the rotation of the fixing protrusion 61 may be prevented by the stepped portions 58b.

Although the drawings illustrate four protruding portions 58, the number is not limited thereto.

The supporter 60 may include the fixing protrusion 61 inserted into the insertion hole 56 and fixed to the fixing groove 57, a base 63 supported by the fixing part 55 and configured to prevent backward movement of the supporter 60 from the bottom chassis 50, and the support protrusion 65 penetrating the light guide plate 20 and supporting the optical sheets 40.

The light guide plate 20 may include a plurality of support protrusion through holes 21 through which the support protrusions 65 of the supporters 60 may pass and the plurality of support protrusion through holes 21 may be provided in a number equal to the number of the supporters 60.

The support protrusion 65 may include an elastic portion 67. A size of the elastic portion 67 may be adjusted to a size of the support protrusion through hole 21, which may be smaller than that of the support protrusion 65, while the support protrusion 65 passes through the support protrusion through hole 21, and return to the original size thereof after the support protrusion 65 passes through the support protrusion through hole 21. Accordingly, the support protrusion 65 may be fixed to the support protrusion through hole 21.

Thus, light guide plate 20 may be seated on the seating portion 51 of the bottom chassis 50 and may be fixed by the support protrusion 65 penetrating the light guide plate 20.

The support protrusion 65 of the supporter 60 penetrating the light guide plate 20 may support the optical sheets 40 to prevent the optical sheets 40 from sagging.

Figure 9:
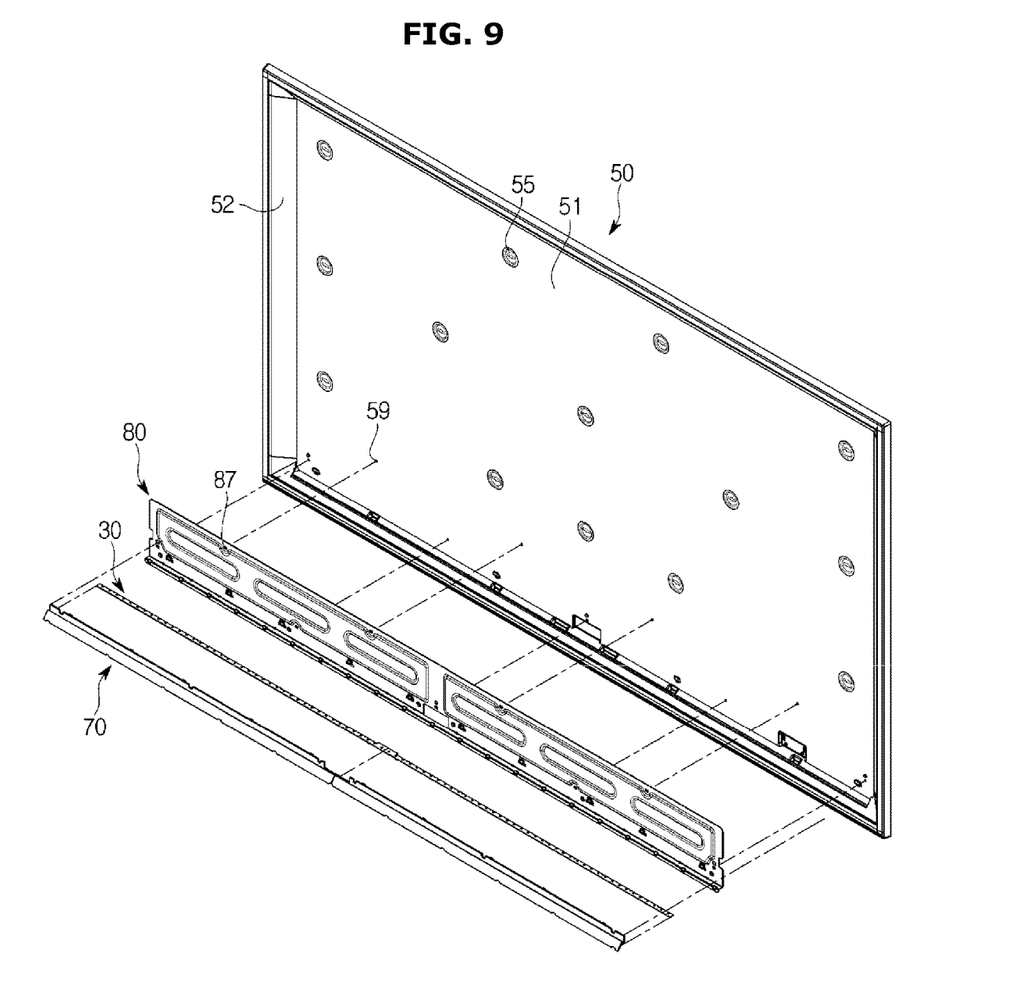
FIG. 9 is a view illustrating that a mounting plate is coupled to a bottom chassis and a fixing rail to which a light source module is fixed and mounted on the mounting plate according to an exemplary embodiment.
Figure 12:
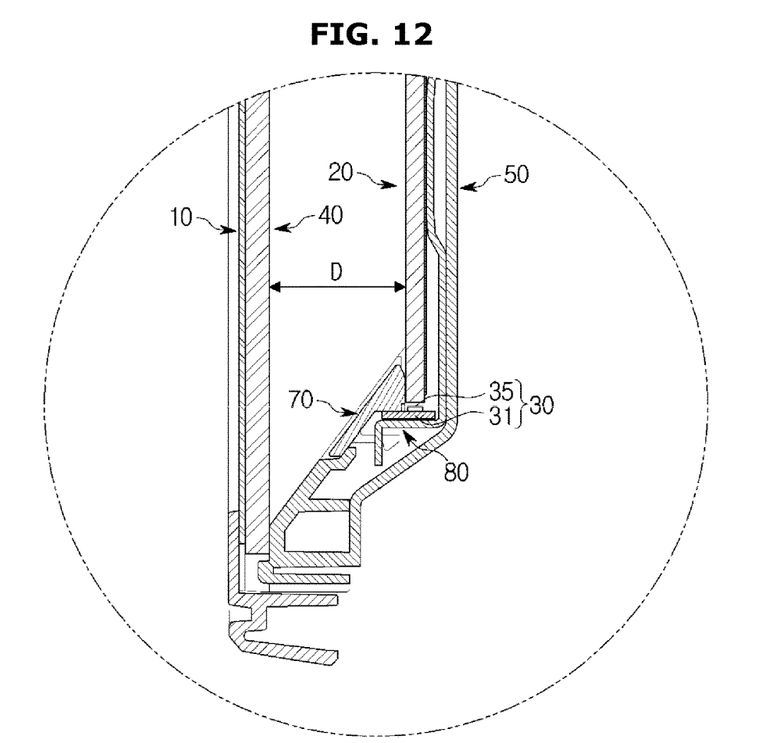
FIG. 12 is a side cross-sectional view of a display apparatus according to an exemplary embodiment.

FIG. 9 is a view illustrating how a mounting plate may be coupled to a bottom chassis and a fixing rail to which a light source module is fixed and mounted on the mounting plate according to an exemplary embodiment. FIG. 10 is a view illustrating the light source module fixed to the fixing rail according to the exemplary embodiment. FIG. 11 is a view illustrating that the fixing rail to which the light source module may be fixed is mounted on the mounting plate according to the exemplary embodiment. FIG. 12 is a side cross-sectional view of a display apparatus according to an exemplary embodiment.

As illustrated in FIGS. 9 to 12, the light source module 30 which may emit light toward the lower end of the light guide plate 20 among edges thereof may be fixed to the fixing rail 70 and the fixing rail 70 may be mounted on the mounting plate 80 coupled to a lower portion of the bottom chassis 50.

The fixing rail 70 may include a plurality of support parts 71 into which the printed circuit board 31 of the light source module 30 is inserted so as to be supported thereby, a plurality of dislocation prevention protrusions 73 configured to fix the printed circuit board 31 inserted into the plurality of support parts 71 to prevent dislocation thereof, an opening 75 configured to allow the plurality of light sources 35 mounted on the printed circuit board 31 to emit light toward the light guide plate 20, and a plurality of fixing hooks 77 fixed to the mounting plate 80.

The plurality of support parts 71 may be provided so as to form a space into which the printed circuit board 31 may be slidably inserted. After the printed circuit board 31 is inserted into the space formed by the plurality of support parts 71, the printed circuit board 31 may be supported by the plurality of support parts 71.

The plurality of dislocation prevention protrusions 73 may be provided to prevent dislocation of the printed circuit board 31 inserted into the space formed by the plurality of support parts 71 in a direction opposite to the inserted direction and fixed by the dislocation prevention protrusion fixing groove 33 of the printed circuit board 31 supported by the plurality of support parts 71, thereby preventing dislocation of the printed circuit board 31.

The opening 75 may be formed to allow the plurality of light sources 35 to face the lower end of the light guide plate 20 among edges thereof such that the plurality of light sources 35 of the light source module 30, which may be fixed to the fixing rail 70, may emit light toward the lower end of the light guide plate 20 among edges thereof.

The plurality of fixing hooks 77 may be fixed by a fixing hole 81 of the mounting plate 80 so as to fix the fixing rail to the mounting plate 80.

The plurality of fixing hooks 77 may include first fixing hooks 78 disposed at lower opposite ends of the fixing rail 70 and fixed by a first fixing hole 82 of the mounting plate 80 and second fixing hooks 79 disposed at the upper end of the fixing rail 70, plural in number, and fixed by a second fixing hole 83 of the mounting plate 80.

The mounting plate 80 on which the fixing rail 70 may be mounted may be coupled to the lower end of the bottom chassis 50.

The mounting plate 80 may include a fixing hole 81 by which the fixing hook 77 of the fixing rail 70 is fixed, a plurality of through holes 85 through which the plurality of dislocation prevention protrusions 73 of the fixing rail 70 pass when the fixing rail 70 is mounted on the mounting plate 80, and a plurality of second coupling holes 87 coupled to the plurality of first coupling holes 59 formed in the bottom chassis 50 for coupling of the mounting plate 80 to the bottom chassis 50.

The fixing hole 81 may include a first fixing hole 82 to fix the first fixing hook 78 of the fixing rail 70 and a second fixing hole 83 to fix the second fixing hook 79.

The mounting plate 80 may be coupled to the bottom chassis 50 by a coupling member (not shown) and may be coupled to the plurality of first coupling holes 59 formed in the bottom chassis 50 and the plurality of second coupling holes 87 formed in the mounting plate 80.

As is apparent from the above description, since an optical distance is formed between the light guide plate and the optical sheets, defects caused by hot spots and light leakage phenomenon may be reduced, and appearance deteriorating factors caused by small scratches and foreign substances on the light guide plate may be compensated for, thereby reducing manufacturing costs.

In addition, since the display panel according to the present disclosure may include a smaller light guide plate than light guide plates used in conventional edge-type backlight units in display panels, manufacturing costs may be reduced.

Also, display panels applied to conventional direct-type backlight units may be used for edge-type display apparatuses without change by designing a height of the extension portion of the bottom chassis equal to the optical distance.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:
   a display panel;
   a light guide plate configured to guide light to the display panel;
   a light source module configured to emit light toward the light guide plate;
   optical sheets disposed between the display panel and the light guide plate, the optical sheets being spaced apart from the light guide plate;
   a bottom chassis, on which the light guide plate is disposed, the bottom chassis configured to support the optical sheets, the bottom chassis forming an optical distance between the optical sheets and the light guide plate; and
   a plurality of supporters fixed to the bottom chassis, the plurality of supporters being configured to support the optical sheets to prevent the optical sheets from sagging,
   wherein the light source module comprises a printed circuit board, the printed circuit board comprising a conductive pattern and a plurality of light sources mounted on the printed circuit board, and the printed circuit board is fixed to a fixing rail such that the plurality of light sources are spaced apart from the light guide plate at regular intervals,
   a mounting plate to mount the fixing rail thereon is coupled to the bottom chassis and the fixing rail is mounted on the mounting plate,
   the fixing rail comprises a plurality of fixing hooks fixed to the mounting plate, the plurality of fixing hooks comprising first fixing hooks disposed at lower opposite ends of the fixing rail and second fixing hooks disposed at an upper end of the fixing rail.

2. The display apparatus according to claim 1, wherein the fixing rail comprises a plurality of support parts into which the printed circuit board is inserted and supported thereby, a plurality of dislocation prevention protrusions fixing the printed circuit board are inserted into the plurality of support parts to prevent dislocation of the printed circuit board, and an opening allowing the plurality of light sources to emit light toward the light guide plate.

3. The display apparatus according to claim 2, wherein the printed circuit board further comprises a plurality of dislocation prevention protrusion fixing grooves to which the plurality of dislocation prevention protrusions is fixed.

4. The display apparatus according to claim 3, wherein the mounting plate comprises first fixing holes configured to fix the first fixing hooks, second fixing holes configured to fix the second fixing hooks, and a plurality of through holes through which the plurality of dislocation prevention protrusions pass.

5. The display apparatus according to claim 1, wherein the bottom chassis comprises a seating portion on which the light guide plate is disposed, an extension portion extending from an edge of the seating portion, the extension portion comprising an inclined surface formed at an obtuse angle with respect to the seating portion, and a support surface provided at an end of the extension portion, the support surface configured to support the display panel and the optical sheets.

6. The display apparatus according to claim 5, wherein an area of the display panel and the optical sheets supported by the support surface is larger than an area of the light guide plate disposed on the seating portion.

7. The display apparatus according to claim 6, wherein the light source module emits light toward a lower end of the light guide plate, light emitted from the light source module is guided to the display panel, the display panel is disposed in front of the light guide plate, and a portion of the light emitted from the light source module is discharged out via a left side, a right side, and an upper end of the light guide plate.

8. The display apparatus according to claim 7, wherein the portion of light discharged out of the light guide plate via the left and the right sides and the upper end of the light guide plate is guided to edges of the display panel, the area of the display panel being larger than an area of the light guide plate along the extension portion of the bottom chassis.

9. The display apparatus according to claim 8, wherein a pattern configured to increase an amount of light guided by the light guide plate is formed at a left and a right edge of a front surface of the light guide plate.

10. The display apparatus according to claim 1, wherein the bottom chassis comprises a plurality of fixing parts to which the plurality of supporters is fixed, and
    the plurality of fixing parts comprises an insertion hole into which the plurality of supporters are inserted, a fixing groove configured to fix the plurality of supporters inserted into the insertion hole, and a plurality of protruding portions constituting the fixing groove.

11. The display apparatus according to claim 10, wherein the plurality of supporters comprises a fixing protrusion inserted into the insertion hole and fixed by the fixing groove, a base supported by the fixing part, and a support protrusion configured to support the optical sheets.

12. The display apparatus according to claim 11, wherein the light guide plate comprises a support protrusion through hole through which the support protrusion passes,
    the support protrusion through hole is provided in a number equal to the number of the plurality of supporters and the plurality of fixing parts, and
    the light guide plate is fixed to the bottom chassis by the support protrusion penetrating the support protrusion through holes.

13. A display apparatus comprising:
    a display panel;
    a light guide plate configured to guide light to the display panel;
    a light source module configured to emit light toward the light guide plate, the light source module comprising a printed circuit board, the printed circuit board comprising a conductive pattern, and a plurality of light sources mounted on the printed circuit board;
    optical sheets disposed between the display panel and the light guide plate;
    a bottom chassis, on which the light guide plate is disposed, the bottom chassis configured to support the display panel such that the display panel and the optical sheets are spaced apart from the light guide plate; and a fixing rail mounted on the bottom chassis, the fixing rail configured to fix the light source module such that the plurality of light sources are spaced apart from the light guide plate at regular intervals, wherein a mounting plate to mount the fixing rail thereon is coupled to the bottom chassis and the fixing rail is mounted on the mounting plate, the fixing rail comprises a plurality of fixing hooks fixed to the mounting plate, the plurality of fixing hooks comprising first fixing hooks disposed at lower opposite ends of the fixing rail and second fixing hooks disposed at an upper end of the fixing rail.

14. The display apparatus according to claim 13, further comprising a plurality of supporters fixed to the bottom chassis, the plurality of supporters configured to support the optical sheets to prevent the optical sheets from sagging.

15. The display apparatus according to claim 14, wherein the plurality of supporters supports the optical sheets in a state of penetrating the light guide plate, and the light guide plate is fixed to the bottom chassis by the plurality of supporters penetrating the light guide plate.

16. A display apparatus comprising:

a display panel;

a light guide plate configured to guide light to the display panel;

a light source module configured to emit light toward the light guide plate;

optical sheets disposed between the display panel and the light guide plate, the optical sheets being spaced apart from the light guide plate;

a bottom chassis comprising a seating portion on which the light guide plate is disposed, an extension portion extending from an edge of the seating portion, the extension portion comprising an inclined surface formed at an obtuse angle with respect to the seating portion, and a support surface provided at an end of the extension portion to support the optical sheets; and a plurality of supporters fixed to the bottom chassis, the plurality of supporters being configured to support the optical sheets in a state of penetrating the light guide plate to prevent the optical sheets from sagging, wherein the light source module comprises a printed circuit board, the printed circuit board comprising a conductive pattern and a plurality of light sources mounted on the printed circuit board, the light source module is fixed to a fixing rail, the fixing rail allowing the plurality of light sources to be spaced apart from the light guide plate at regular intervals, a mounting plate to mount the fixing rail thereon is coupled to the bottom chassis and the fixing rail is mounted on the mounting plate, and the fixing rail comprises a plurality of fixing hooks fixed to the mounting plate, the plurality of fixing hooks comprising first fixing hooks disposed at lower opposite ends of the fixing rail and second fixing books disposed at an upper end of the fixing rail.

* * * * *